US005315828A

United States Patent [19]

Stellwagen et al.

[11] Patent Number: 5,315,828

[45] Date of Patent: May 31, 1994

[54] VALVE ASSEMBLY FOR LOAD INDEPENDENT CONTROL OF MULTIPLE HYDRAULIC LOADS

[75] Inventors: Armin Stellwagen, Lohr, Fed. Rep. of Germany; Walter Scandella, Osio Sotto, Italy

[73] Assignee: Mannesmann Rexroth GmbH, Lohr, Fed. Rep. of Germany

[21] Appl. No.: 969,737

[22] Filed: Oct. 30, 1992

[30] Foreign Application Priority Data

Oct. 30, 1991 [DE] Fed. Rep. of Germany ....... 4135836
Nov. 19, 1991 [DE] Fed. Rep. of Germany ....... 4137963

[51] Int. Cl.[5] .............................................. F16D 31/02

[52] U.S. Cl. ....................................... 60/426; 60/494; 91/517; 91/532

[58] Field of Search ................. 91/508, 511, 514, 517, 91/516, 518, 519, 532; 60/445, 452, 420, 422, 426, 494

[56] References Cited

U.S. PATENT DOCUMENTS

| | | | |
|---|---|---|---|
| 3,568,868 | 3/1971 | Chichester | 91/516 X |
| 3,994,133 | 11/1976 | Pfeil et al. | 91/516 X |
| 4,343,151 | 8/1982 | Lorimor | 91/516 X |
| 4,635,439 | 1/1987 | Wible | 60/516 X |
| 4,669,363 | 6/1987 | Kreth et al. | 91/516 |
| 4,738,103 | 4/1988 | Tha | 60/452 X |
| 4,966,066 | 10/1990 | Kauss et al. | 91/516 |
| 5,127,226 | 7/1992 | Suzuki et al. | 60/452 X |
| 5,182,909 | 2/1993 | Stellwagen | 60/426 |

FOREIGN PATENT DOCUMENTS 3634728 4/1988 Fed. Rep. of Germany .

*Primary Examiner*—Edward K. Look
*Assistant Examiner*—Hoang Nguyen
*Attorney, Agent, or Firm*—Cushman, Darby & Cushman

[57] ABSTRACT

The present invention relates to a valve assembly for the supply of users in hydraulic control systems with pressurized fluid for the load pressure (LS) independent control of several simultaneously actuated hydraulic users wherein the ratio of the partial flows once set is maintained at undersupply of the system with the pressurized fluid. When the demand of the users exceeds the maximum output flow of the variable displacement pump, the (high) priority users receive the demanded quantity whereas the low priority users receive a reduced quantity by switching the control pressure for the low (i.e. no) priority users via a directional control valve and a pressure relief valve to a lower pressure level. Only when undersupply of the entire system occurs, i.e. when the maximum output flow of the variable displacement pump is no more sufficient despite the limitation of the control pressure for the low priority users, then the presently flowing partial flows of all users are reduced proportionally.

9 Claims, 3 Drawing Sheets

VALVE ASSEMBLY FOR LOAD INDEPENDENT CONTROL OF MULTIPLE HYDRAULIC LOADS

FIELD OF THE INVENTION

This invention relates to a valve assembly for supplying loads (or users) in hydraulic control systems with pressurized fluid to control independently of the load several simultaneously actuated hydraulic users for which the ratio of the partial flows, once set or adjusted, remains the same (unchanged) even when the system is undersupplied with fluid. A valve assembly of this type is disclosed in DE-OS 36 34 728.

BACKGROUND OF THE INVENTION

With construction vehicles or machines, in particular with excavators, it is essential to actuate the individual users such as slew means, boom, dipper, and bucket independently from each other and sometimes also simultaneously. During independent individual operation of the users, the maximally available amount of pressurized fluid can be supplied to the users, if necessary.

During parallel operation during which a constant speed of the users is desirable, the maximally available amount of pressurized fluid must be distributed evenly (or proportionally) to the users. In every mode of operation the users should be operating independently of the load.

For example, in the control of an excavator, during individual operation, high speeds of the equipment such as boom and dipper are required whereas the speed of the slew means should be less. During parallel operation, such as when loading, the movements of the boom, dipper, and slew means should occur at approximately the same speeds. To facilitate manipulation or control this should occur automatically at the extremal position of the control signal generator means.

SUMMARY OF THE INVENTION

It is an object of the invention to provide a valve assembly which varies, if an undersupply exists, the ratio of the distribution of the quantity (of fluid) during parallel operation of several users such that certain users are preferred. For example, during parallel operation, two users which during individual operation are supplied with very much different quantities should move independently of the load at approximately the same speed. This ratio should be maintained at undersupply.

Example: excavator control with individual operation boom 400 l/min; dipper 400 l/min; slew means 200 l/min.

- A high individual speed of the equipment is desired while the speed of the slew means must be less.
- Typical movements such as during loading require parallel operation of boom, slew means, and dipper.
- During such parallel operation the speeds of the three users should not differ significantly in order to increase the controllability.

The above mentioned object is achieved according to the invention by providing a valve assembly for the load independent control of multiple hydraulic users such as slew means, boom, dipper, and bucket of excavators, wherein the output flow of a source of pressurized fluid being a variable displacement pump is adjustable independently of the load pressure of the users and wherein the hydraulically controllable control valves associated with the users are adapted to be controlled by control signal generator means being designed as pressure control valves, characterized in that the control pressure for the actuation of one or several control valves for high priority users controls a further valve which causes a distribution of the flow of pressurized fluid such that one or several users are supplied with high priority or are preferred. Advantageous modifications of the invention are disclosed in the dependent claims.

If the amount of pressurized fluid demanded by the control signal generator means is larger than the maximal output flow of the variable displacement pump then, according to the invention, the high priority users receive the demanded amount or rate of fluid, respectively, whereas the low priority users receive at most the remaining amount.

BRIEF DESCRIPTION OF THE DRAWINGS

In the following, an embodiment of the invention is described in detail with reference to an excavator control.

In the drawing.

DETAILED DESCRIPTION OF A PREFERRED EMBODIMENT

Figure 1A:
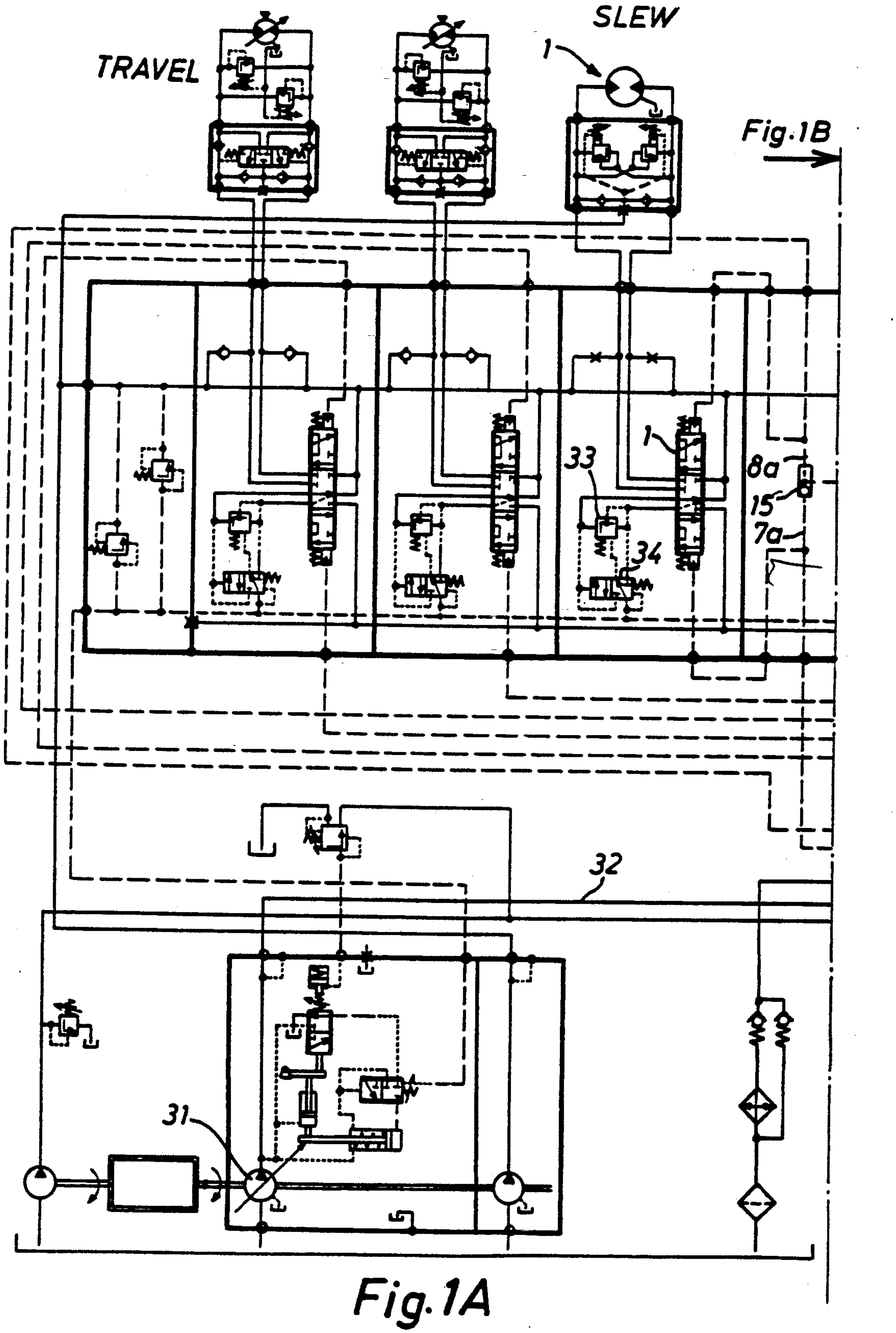
FIGS. 1A and 1B together show a circuit diagram of an excavator control.
Figure 1B:
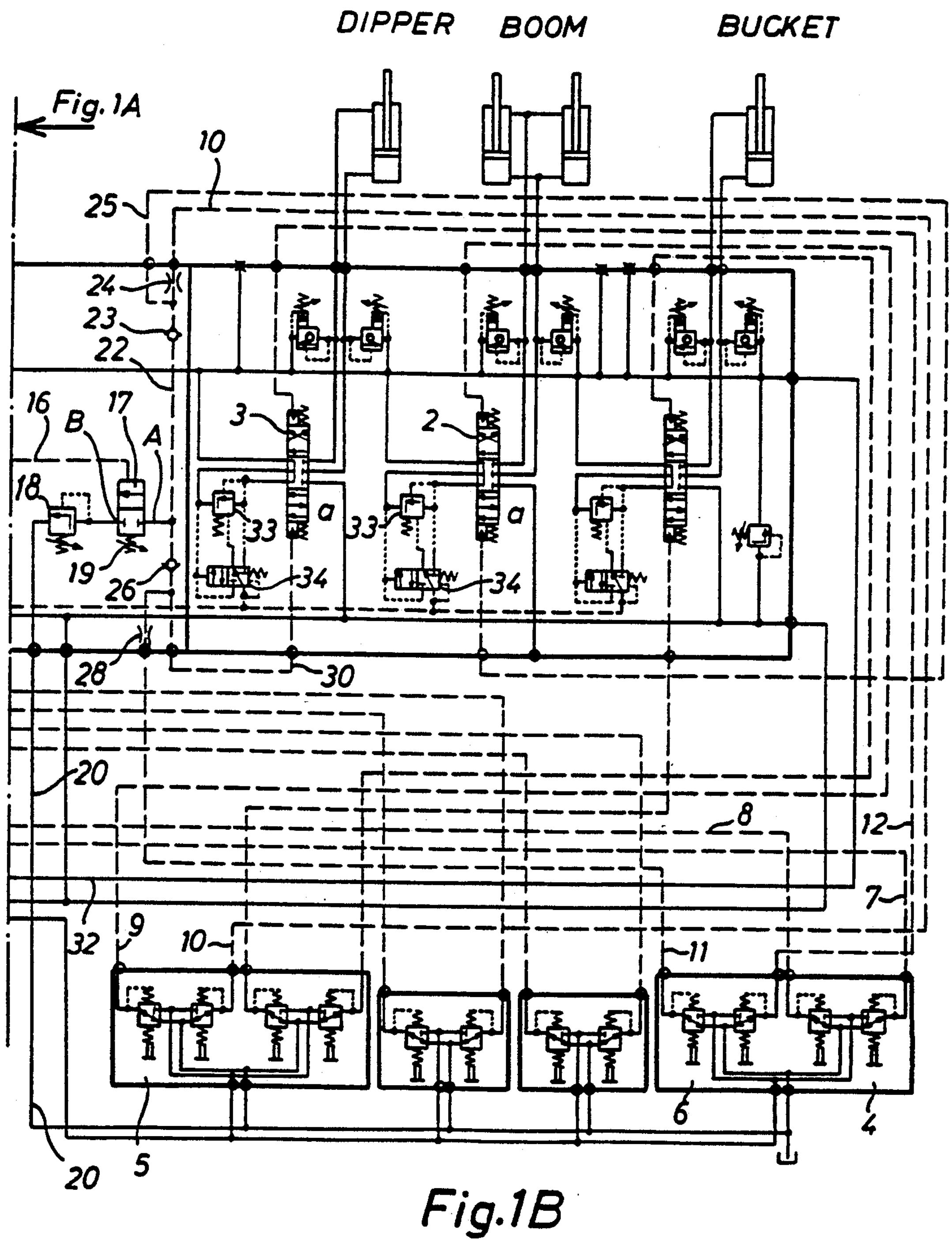

In FIGS. 1A and 1B, reference numeral 1 generally denotes the control valve for the slew means, reference numerals 2 and 3 generally denote the control valves for the boom and the dipper, respectively. The control of the control valve is effected by control signal generator means 4, 5, and 6 which control the control valves 1, 2, and 3 via control lines 7, 8, 9, 10, 11, and 12.

The control lines 7 and 8 of the control signal generator means 4 include branches 7*a* and 8*a* which lead to a shuttle valve 15 the output of which is connected to the control port of a valve 17, being configured as a 2-way directional valve via control line 16. The opposite side of the valve is biassed by an adjustable compression spring 19.

The output B of valve 17 is connected to a reservoir line 20 via a pressure relief valve 18. The input A of valve 17 is connected to a check valve 23 and a throttle 24 via a control line 22, and further to the control signal generator means (control device) 5 via control line 10. The control signal generator means 5 controls the movement of control valve 2 via control line branch 25 into switching position "a" in which pressure is applied to the bottom side of the boom cylinder (see FIG. 1B). Further, the input A is connected via check valve 26 and throttle 28 as well as control line 11 to control signal generator means 6 for the dipper, the control pressure in this control line moving the control valve 3 into switching position "a" in which pressure is applied to the bottom side of the dipper cylinder.

The output B of valve 17 is connected to the input of a pressure relief valve 18. In the shown switching position of valve 17 the connection between ports A and B is blocked and hence also the connection to pressure relief valve 18 and eventually to reservoir line 20 is blocked.

The control pressure provided by the control signal generator means 4 for the control valve 1 of the slew means is passed on to the control side of valve 17 via shuttle valve 15 and switches at a certain switching pressure to be adjusted by spring 19 the valve 17 from the closed position, as shown, into the open position. Thus, in control line 25 for the control valve 2 for the bottom side of the boom, as well as in control line 30 for the control valve 3 of the dipper, a control pressure only can build up to a certain value as determined by pressure relief valve 18.

The pressure relief valve 18 thus determines the maximum opening of the control valves 2 and 3 for the bottom sides of the boom and dipper cylinders and hence determines their extension rate or speed. As long as valve 17 is in its closed position as illustrated, the pressure relief valve 18 for the control fluid or liquid of the respective control valves 2 and 3 will not become active. Said control valves can thus be moved to their extremal positions by means of the control signal generator means 5 and 6, respectively. The operating fluid (or liquid) for the user is provided by the variable displacement pump 31. The operating fluid or liquid provided by said variable displacement pump 31 is directed via pressure conduit 32 to the individual control valves 1, 2, and 3 as well as to control valves for bucket and travel means which do not bear reference signs.

To obtain a load independent control, a pressure compensator 33 with a switching valve 34 is associated with each control valve. By means of the switching valve(s) 34 the highest occurring load is applied on the side of the spring to each of the individual pressure compensators and thus, at undersupply of the entire or total control, i.e. when more operation fluid is demanded by the position of the control valves than the pump can supply, the maximally available output flow from the pump is distributed to the users in accordance with the respective cross section (orifice) of the control valves.

The throttles 24,28 for the boom and the dipper positioned in the control lines 10 and 11, respectively, assure that with the pressure relief valve 18 being open the limited pressure as established by the pressure relief valve 18 is established in the line sections 25 and 30 downstream of the throttles.

The operation of the control of FIGS. 1A and 1B is illustrated in detail with reference to FIG. 2.

Figure 2:
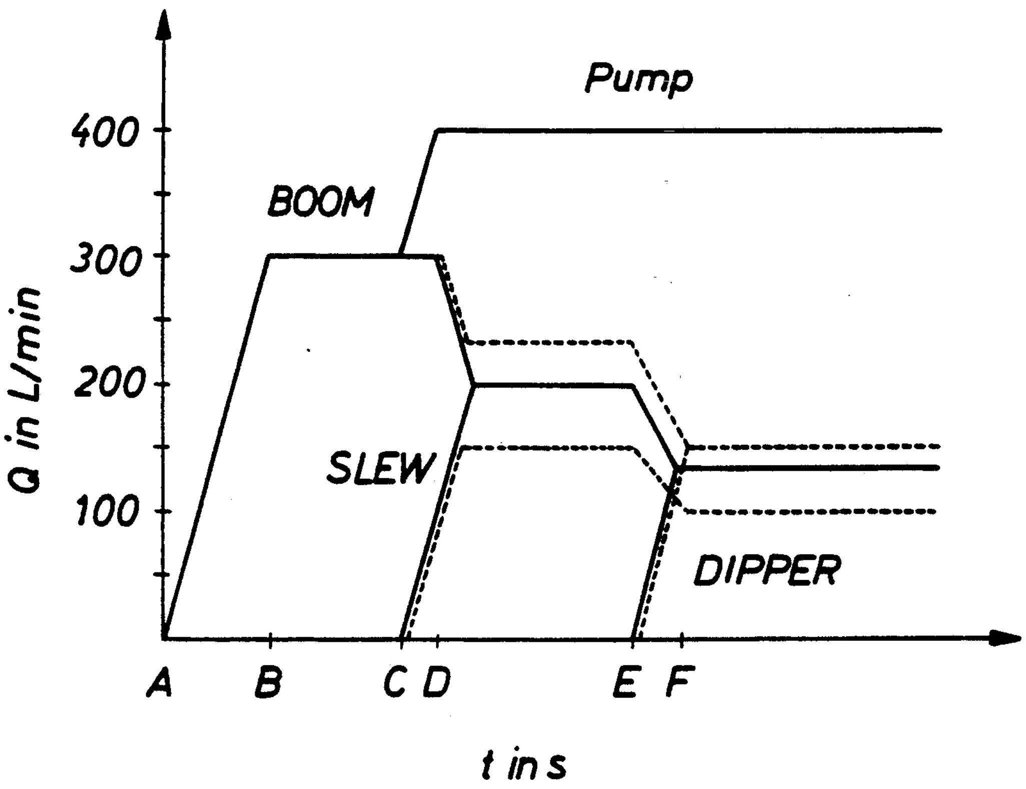
FIG. 2 shows a diagram with the quantity distribution for the loading operation of the excavator, the boom, the slew means, and the dipper of the excavator being operated in parallel. The broken lines are obtained without the high priority control of the slew.

The diagram of FIG. 2 illustrates the control of the users in a time sequence. The X-axis refers to the time t. The Y-axis, designated Q, refers to the quantities or rates (speeds), respectively, of the individual users are shown or indicated.

During a loading operation, for easier handling, the operator actuates the control signal generator means (or control handle) up to their end positions. During individual operation, each user reaches its maximum rate or speed predetermined by the control valve cross section and the maximum output flow of the pump, respectively. In the present example it is assumed that during individual operation, the user boom and the user dipper may reach a maximum rate or speed of 300 l/min and the slew means having priority may reach a maximum rate or speed of 200 l/min. The maximum output flow of the pump is assumed to be 400 l/min so that during parallel operation of the users undersupply occurs when the total rate of the users increases beyond 400 l/min.

At a time A, according to FIG. 2, the control signal generator means 5 is actuated to its extremal or end position for the switching position "a" (see FIG. 1) of the control valve 2 for the boom. As a result the control pressure in control line 10, 25 reaches the maximum value of for example 30 bar, and the control valve for the boom opens to the end position (100%). The pump 31 increases its output flow or displacement and at time B the boom reaches its maximum rate or speed of 300 l/min.

At the time C the control signal generator means 4 for control valve 1 of the slew means is actuated to its extremal or end position. The control pressure in the control lines 7 and 8, respectively, also reaches a value of 30 bar such that the control valve 1 for the slew means opens to the extremal or end position.

At the time D the pump 31 provides the maximum output flow of 400 l/min with the boom still receiving 300 l/min and the slew means receiving 100 l/min.

According to prior art control systems without priority control, at this time D, the undersupply control would start and would distribute the maximum output flow of the pump proportionally to the slew means and the boom according to their nominal values (rates or speeds). The broken lines show this quantity distribution.

According to the present invention, however, at time D the priority control becomes effective, by passing the control pressure for the preferential (or priority) slew means at the same time via shuttle valve 15 to the directional control valve 17; and control valve 17 is opened when the set spring force of the compression spring, e.g. 19 bar, is exceeded. Thereby, the control pressure of 30 bar for the boom is reduced to a lower maximum control pressure of approx. 20 bar which is set by the pressure relief valve 18 located downstream of valve 17, and, accordingly, the control valve 2 for the boom is taken back or reduced to approx. 66% of its nominal cross section.

The rate or speed to the boom is thus reduced from 300 l/min to 200 l/min. Since the maximum output flow of the variable displacement pump is 400 l/min, the 200 l/min necessary for the maximum rate or speed of the slew means are now available to the slew means. The speed or rate of the slew means increases thus from 100 l/min to its maximum speed or rate of 200 l/min in the same manner as the rate or speed of the boom decreases from 300 l/min to 200 l/min.

By limiting the control pressure for the boom to 20 bar, an undersupply of the users does not yet occur. Only when, in addition, the dipper is actuated to its extremal or end position, at time E, the maximum control pressure of 20 bar according to the setting at the pressure relief valve 18 then being applied to its control valve, the maximum output flow of the pump of 400 l/min is no more sufficient for also supplying this user with the demanded amount or quantity of operation fluid.

Thus, at this point in time, the undersupply control becomes active in that the pressure compensators 33 associated with the measuring orifices of the control valves 1, 2, 3 and controlled by the maximum control pressure towards the closed position, function to distribute the output flow of the pump according to the openings of the control valves. I.e. the pressure compensators 33 assume their function of distribution. The maximum output flow of the pump is thus distributed proportionally relative to the cross sectional openings of the respective control valves by the pressure compensators to all of the three users, namely boom, slew means, and dipper.

Until the time F, the rates or speeds of boom and slew means are decreased from 200 l/min to approx. 133 l/min while the rate or speed of the added dipper increases similarly to approx. 133 l/min so that, from time F onwards, the boom, the slew means, and the dipper move at approximately the same speed or rate.

By setting the pressure at the pressure relief valve 18, the predetermined ratio of the rates or speeds for parallel use of the high priority users and the low priority users can also be set differently.

Owing to the priority control, the maximum rate or speed of the boom or dipper, respectively, for individual operation can, of course, be chosen to be higher (up to the maximum output flow of the pump of 400 l/min) without losing the benefit of the same rate or speed of all users during parallel operation.

The description of FIG. 1 was restricted to the elements being important for the understanding of the present invention. The other users such as travel means and bucket are of no essential importance for the comprehension and appreciation of the invention.

Instead of valve 17 influencing the control pressure, a conventional variable 3-way directional valve which divides the flow of pressurized fluid into a priority flow and a low or no-priority flow can be provided comprising an input for the pump conduit 32 and two outputs for the high and low priority users, wherein the size or quantity of the partial flows is determined by the control pressure for the high priority users.

Instead of a 3-way directional valve in the pump conduit 32, also a 2-way directional valve can be included for the low priority users, thus only setting or determining the size or amount of the partial flow for the low priority users. Finally, valve 17 and pressure relief valve 18 can be established as a pressure proportional valve performing both functions.

The operation fluid is preferably a hydraulic oil

Thus, the invention relates to a valve assembly for the supply of users in hydraulic control systems with pressurized fluid for the load pressure (LS) independent control of several simultaneously actuated hydraulic users wherein the ratio of the partial flows once set is maintained at undersupply of the system with the pressurized fluid. When the demand of the users exceeds the maximum output flow of the variable displacement pump, the (high) priority users receive the demanded quantity whereas the low priority users receive a reduced quantity by switching the control pressure for the low (i.e. no) priority users via a directional control valve and a pressure relief valve to a lower pressure level. Only when undersupply of the entire system occurs, i.e. when the maximum output flow of the variable displacement pump is no longer sufficient despite the limitation of the control pressure for the low priority users, then the presently flowing partial flows of all users are reduced proportionally.

What is claimed is:

1. A valve assembly for load independent control of a plurality of hydraulic users, comprising:

a source of pressurized fluid providing a load pressure to the hydraulic users;

a plurality of pressure control valves (4, 5, 6);

a plurality of hydraulically controlled control valves (1, 2, 3) adapted to be controlled by said plurality of pressure control valves (4, 5, 6) for providing a control pressure;

at least one of said hydraulically controlled control valves (1, 2, 3) controlling a high priority user by providing a first control pressure; and at least another of said hydraulically controlled control valves (1, 2, 3) controlling a low priority user by providing a second control pressure having a maximum value;

wherein said valve assembly further comprises a valve means (17, 18) adapted to be controlled by said first control pressure, said valve means (17, 18) selectively effecting a decrease in said maximum value of said second control pressure, and said source of pressurized fluid being a variable displacement pump that it adjustable independently of the load pressure of the hydraulic users.

2. Valve assembly according to claim 1, wherein the control pressure is applied to said valve means acting from a closed position toward an open position, and wherein said valve means switches said maximum value of said second control pressure to a lower value for the actuation of the control valves (1, 2, 3) of low priority users.

3. Valve assembly according to claim 1, wherein said valve means includes a valve component (17) and a pressure relief valve (18), said pressure relief valve (18) being positioned downstream of said valve component (17) for discharging the control fluid.

4. Valve assembly according to claim 1, wherein a force acting towards a closed position is applied to the valve means (17) by an adjustable compression spring (19).

5. Valve assembly according to claim 1, wherein the valve means (17) is a pressure proportional valve.

6. Valve assembly according to claim 1, wherein the lower control pressure level for one or more low priority users is set such that a rate or speed of said users corresponds approximately to a rate or speed of the priority users.

7. Valve assembly according to claim 1, wherein the valve means (17) operates as a 2-way proportional valve to pass a partial flow to the low priority users.

8. Valve assembly according to claim 1, wherein said users are respectively slew means, boom, dipper, and bucket of an excavator.

9. A method for the load pressure (LS) independent control of several simultaneously actuated hydraulic users connected to a hydraulic control system, wherein a ratio of partial flows once set is maintained at undersupply of the system with pressurized fluid, wherein when a demand of the users exceeds a maximum output flow of a variable displacement pump, high priority users receive a demanded quantity whereas low priority users receive a reduced quantity by switching a control pressure for the low priority users via a directional control valve and a pressure relief valve to a lower pressure level, and wherein, when maximum output flow of the variable displacement pump is insufficient despite said lowering of the control pressure for the low priority users, then the presently flowing partial flows of all users are reduced proportionally.

* * * * *